United States Patent [19]
Züfle

[11] Patent Number: 5,940,584
[45] Date of Patent: Aug. 17, 1999

[54] METHOD AND APPARATUS FOR ELECTRONICALLY FILING DOCUMENTS PREPARED BY A COMPUTER

[75] Inventor: Joachim Züfle, Berlin, Germany

[73] Assignee: Océ Printing Systems GmbH, Poing, Germany

[21] Appl. No.: 08/702,670

[22] PCT Filed: Mar. 10, 1995

[86] PCT No.: PCT/DE95/00336
§ 371 Date: Sep. 6, 1996
§ 102(e) Date: Sep. 6, 1996

[87] PCT Pub. No.: WO95/24794
PCT Pub. Date: Sep. 14, 1995

[30] Foreign Application Priority Data

Mar. 11, 1994 [DE] Germany .............................. 44 08 327

[51] Int. Cl.⁶ .............................. G06K 9/36; G06F 15/00
[52] U.S. Cl. ........................ 395/114; 395/102; 395/115; 382/304; 382/305
[58] Field of Search ..................... 395/102, 109, 395/112, 113, 114, 115, 116, 821; 382/304, 305; 707/100, 200, 204

[56] References Cited

U.S. PATENT DOCUMENTS

| | | | |
|---|---|---|---|
| 5,008,926 | 4/1991 | Misholi . | |
| 5,054,096 | 10/1991 | Beizer ...................................... | 382/305 |
| 5,748,859 | 5/1998 | Takayanagi et al. ..................... | 395/109 |
| 5,778,352 | 7/1998 | Inoue et al. ................................. | 707/1 |

FOREIGN PATENT DOCUMENTS

| | | |
|---|---|---|
| 0 561 606 A1 | 9/1993 | European Pat. Off. . |
| 33 13 737 A1 | 10/1983 | Germany . |
| 34 38 081 C2 | 2/1985 | Germany . |
| 38 00 635 A1 | 7/1988 | Germany . |
| 38 24 976 | 2/1989 | Germany . |
| 40 00 671 A1 | 7/1990 | Germany . |
| 43 07 577 A1 | 9/1993 | Germany . |
| WO 94/05113 | 3/1994 | WIPO . |

OTHER PUBLICATIONS

Software DocuWare 3.0, Mikrofilm Muenchen, Moosfeld, Muenchen, 1993, Germany, Alte Hasen Wissen Schon Heute, Worin Die Zukunft Liegt, 6 pages.

Siemens Nixdorf Publication, U 9737–J–Z247–2, Siemens Nixdorf Printer Data Stream, Modell 4, Jun. 1993, Germany, pp. 1–19.

*Primary Examiner*—Edward L. Coles
*Assistant Examiner*—Mark Wallerson
*Attorney, Agent, or Firm*—Hill & Simpson

[57] ABSTRACT

Filing the documents prepared by a computer (HOST) without a detour via a computer printout, by virtue of the fact that, as in the case of driving a printer, the printing data (SPDS) which can be retrieved via a printer connection interface (CH) of the computer (HOST) is converted into a pixel data stream (PIX-DAT). In parallel therewith text information and bar codes are filtered out of the printing data stream and neutralized and converted into an index data stream (IND-DAT). The two data streams are then logically synchronized and fed to the filing data carrier (ARCHIV). Designing the apparatus as a self-contained apparatus (APALINK) or as a combined apparatus having a printer (PRINTER) and an ancillary device (PC), it also is possible for the ancillary device to be an integral component of the printer. Furthermore, it is possible for the filing to be performed in parallel with printing out or without simultaneous printing out.

22 Claims, 2 Drawing Sheets

METHOD AND APPARATUS FOR ELECTRONICALLY FILING DOCUMENTS PREPARED BY A COMPUTER

BACKGROUND OF THE INVENTION

The invention relates to a method and apparatus for electronically filing documents prepared by a computer.

The customary way of filing the documents prepared by a computer comprises using an optical scanner to scan the document, present as a computer printout, and storing the image thus obtained and converted into electric video signals in an archive which uses magnetic tapes, magnetic or optical storage plates, for example, as recording media. In addition, it is also possible to use an optical character reader to extract text information and bar codes contained in the document. The video signals and the extracted information are then combined to form a data record and fed to the archive memory (see U.S. Pat. No. 5,054,096, for example).

SUMMARY OF THE INVENTION

By contrast, the aim of the invention is the direct filing of the documents prepared by a computer without the detour via a computer printout on paper.

In general terms the present invention is a method for electronically filing documents prepared by a computer. The printing data, which can be retrieved via a printer connection interface of the computer in the form of coded control statements, is converted into a pixel data stream suitable for driving the exposure unit of a printer. In addition, text information and bar codes are filtered out as index data from the printing data that is to be converted into a pixel data stream, and are neutralized and converted into an index data stream. The two data streams are fed, with identifiers indicating the relatedness of parts of the two data streams to a data carrier for filing.

Advantageous developments of the method of the present invention are as follows.

The printing and pixel data required for filing a document are supplied by appropriate terminals of the printer controller of a printer connected to the computer supplying the printing data. Different operating modes are selectable. Depending on the respectively selected operating mode, filing of documents is possible in parallel with, or without simultaneous printing out by the printer part of the printer, or else only printing out without simultaneous filing is possible, the control being performed from the ancillary device in the case of filing alone, and from the printer in the case of printing out.

The pixel data stream is compressed before being relayed to the filing data carrier.

The compressed pixel data stream and the index data stream are buffered before being relayed.

In each case the printing data of one document side is converted and the data streams resulting therefrom are fed in a pagewise fashion to the filing data carrier.

The present invention is also an apparatus for controlling the electronic filing of the documents prepared by a computer, wherein it can be connected to the input side like a printer to a printer connection interface of the computer supplying the printing data for the documents, and on the output side to a filing data carrier. The apparatus comprises the following elements: devices for retrieving and for accepting the printing data from the computer; devices for converting the printing data into a pixel data stream; devices for filtering out and neutralizing the text information and bar codes, contained in the printing data, as index data in the form of an index data stream; and devices for relaying the two data streams with identifiers indicating the relatedness of parts of the two data streams to the data carrier.

The present invention is also an apparatus for controlling the electronic filing of the documents prepared by a computer, wherein a printer connected to the computer, and an ancillary device, coupled to the printer controller of the printer as a link to the filing data carrier. The ancillary device comprises the following elements: devices for exchanging control signals with the printer controller; devices for controlling the acceptance of the pixel data stream from the printer controller; devices for controlling the acceptance of the printing data from the printer controller, as well as, for filtering out and neutralizing the text information and bar codes, contained in the printing data, as index data, with the formation of a corresponding index data stream; and devices for relaying the two data streams with identifiers indicating the relatedness of parts of the two data streams to the data carrier.

Advantageous developments of this embodiment of the present invention are as follows.

The ancillary device is an integral component of the printer.

The interface which supplies the pixel data stream for the exposure unit of the printer serves as one of the connections for the ancillary device. The connection can be controlled in accordance with the respectively selected operating mode (only printing, printing and filing, only filing).

The apparatus has devices for buffering the two data streams formed before the relaying to the filing data carrier.

The apparatus has devices for compressing the pixel data stream before the buffering.

The devices for forming the index data stream, for compressing the pixel data and for exchanging the control signals are designed as pluggable interface cards for connection to the system bus of a PC which controls the filing operation and whose main memory serves the purpose of buffering the data streams.

In doing so, the invention makes use of the fact that documents created and processed by a computer for printing out by a printer have already been prepared in an appropriate way by the computer itself before they are passed, in the form of a stream of printing data together with the customary control statements, via a printer connection interface to the printer which then converts the printing data by means of rastering into a pixel data stream for controlling the exposure unit of the printer.

In a similar way, the invention now makes use of such a printer connection for the purpose of directly filing the documents, it being the case that, on the one hand, the stream of printing data supplied by the computer is rastered in a known way and converted as a result into a pixel data stream and, on the other hand, that text information and bar codes contained in the stream of printing data as index data are automatically filtered out and neutralized and converted into an index data stream parallel to the pixel data stream. The two data streams are then, combined to form a data record as a logic unit, relayed in a known way to a data carrier for filing purposes.

Separate devices for accepting the printing data from the computer and for converting them into a pixel data stream can be avoided when, in accordance with patent claim 2, the printing and pixel data required for filing a document are supplied by appropriate terminals of the printer controller of a printer connected to the computer supplying the printing data. It is expedient in this case in accordance with patent claim 3 to provide different operating modes according to which filing alone without simultaneous printing out, or else printing out with or without simultaneous filing is possible.

It is, furthermore, advantageous when before being relayed to the filing data carrier the pixel data stream is compressed according to a known compression algorithm, and when both the compressed pixel data stream and the index data stream formed are buffered before being relayed.

The index data and pixel data of multipage documents are in this case expediently processed and filed by page, in each case.

In one case, this is a self-contained apparatus which is a direct link between the printer connection interface of a computer and the connection of a data carrier for filing with the devices required to carry out the method in accordance with the invention.

In the other case, this is a combined apparatus composed of a printer and an ancillary device, the ancillary device containing only the devices which are required for the functions, not carried out by the printer controller, of the method in accordance with the invention.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
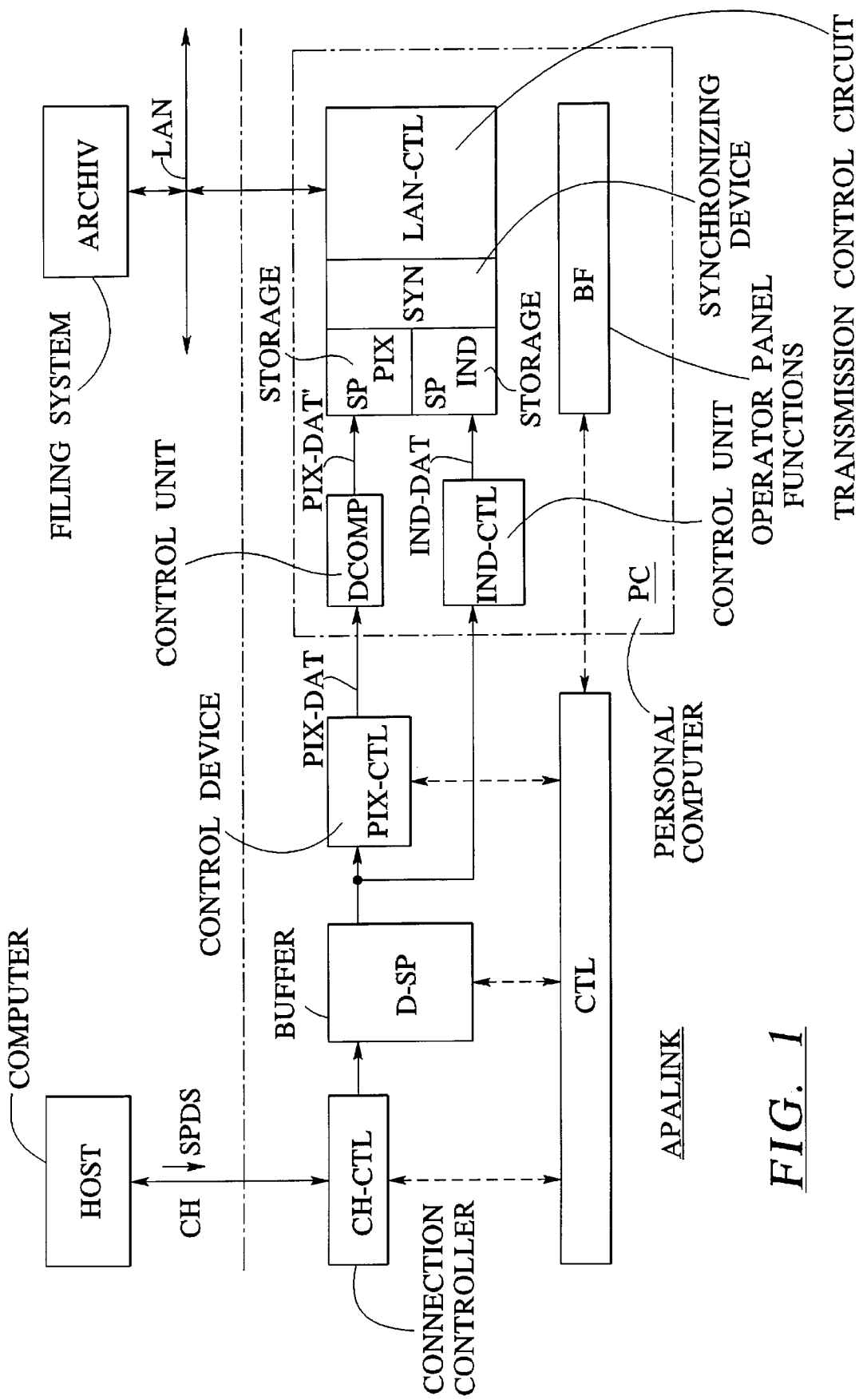
FIG. 1 shows a unitary apparatus in accordance with the invention.

FIG. 1 shows in the left-hand upper part a computer HOST and in the right-hand upper part a filing system ARCHIV, which can be designed at will. The two devices, connected via appropriate connections, which can be designed as a channel CH or as a wiring system LAN, to the new apparatus APALINK, which in the view of the computer operates like a printer, and in the view of the filing system operates like a scanner, with the result that documents prepared and stored by the computer HOST can be passed to the filing system ARCHIV directly without the detour via a paper printer.

The stream SPDS of printing data prepared by the computer HOST and, for example, supplied via a connecting channel CH as a printer connection interface can be formed in any known way, for example in accordance with the instructions in the Siemens Nixdorf printed publication U 9737-J-Z247-2, "Siemens Nixdorf Printer Data Stream" of June 1993. This stream of printing data is fed in a known way to a connection controller CH-CTL which evaluates the control commands and feeds the actual printing data to a buffer D-SP.

On the one hand, this buffer D-SP is coupled to the control device PIX-CTL, which interprets the individual printing data in a known way and generates a corresponding stream PIX-DAT of pixel data by means of rastering. This pixel data stream is then compressed by the control unit DCOMP according to one of the known algorithms, and temporarily stored in the storage unit SPPIX for relaying purposes.

In parallel therewith, the printing data are fed from the buffer D-SP via a separate connection interface to the control unit IND-CTL, which filters out the text information and bar codes as index data and thereby neutralizes them in such a way that, for example, all the additional data relating to type style, type size etc. are suppressed. The stream IND-DAT of index data thereby produced is then temporarily stored in parallel with the associated compressed stream PIX-DAT' of pixel data in a further storage unit SPIND for relaying purposes.

In order also to be able to identify as a logic unit the separate data streams PIX-DAT' and IND-DAT, which respectively relate to the same document page, they are provided by the device SYN with mutually corresponding identification symbols, that is to say they are logically synchronized, before they are relayed one after another to the transmission control circuit LAN-CTL of the wiring system LAN leading to the filing system ARCHIV. This wiring system can be designed in a desired way, for example as a "local area network", or else as a direct connection to a data carrier serving as archive.

As is indicated in the right-hand part of the figure by the dashed and dotted frame, it is possible, for example, to use for some of the functional units a conventional personal computer PC which is fitted with connections for accepting the stream PIX-DAT of pixel data and the stream of printing data for forming the stream IND-DAT of index data by means of the control unit IND-CTL, and which instead of the operator panel, present in the case of a printer, for the control unit CTL simulates the required operator panel functions BF by corresponding functions on the user interface in conjunction with a further computer connection for the control unit CTL in order to control the remaining functional units CH-CTL, D-SP and PIX-CTL.

Figure 2:
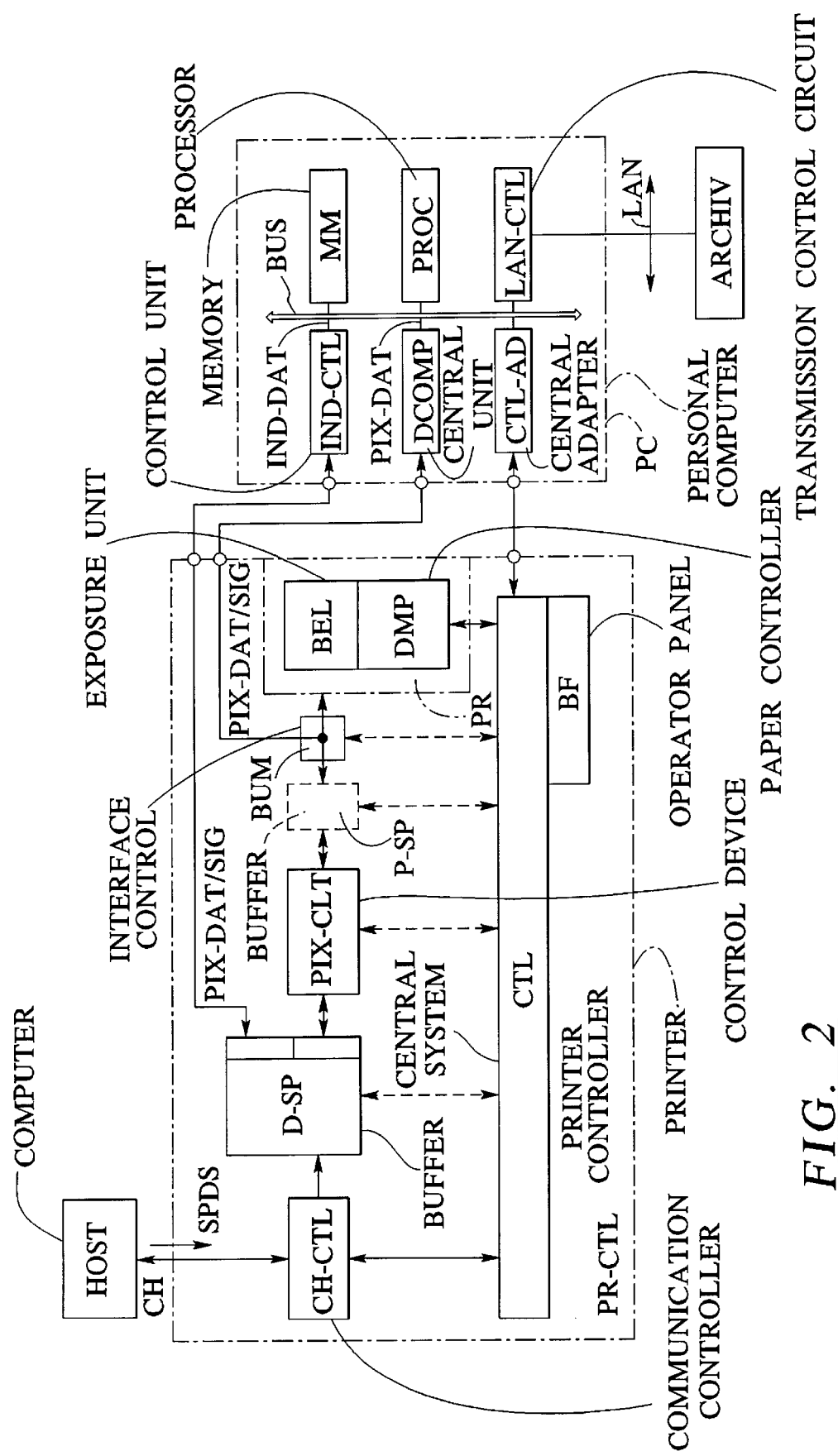
FIG. 2 shows an apparatus according to the invention comprising a printer and ancillary device.

In the apparatus shown in FIG. 2, a printer PRINTER is used in conjunction with an ancillary device PC for the purpose of direct filing, similar functional units being provided with the same designations as in FIG. 1. In the printer controller PR-CTL, these are the connection or interface controller CH-CTL for the connecting channel CH of the computer HOST, which supplies the printing data DPDS, the downstream memory D-SP for the printing data and the adjoining control device PIX-CTL for generating the pixel data which, possibly on the way to the actual printer part PR with the exposure unit BEL and printer mechanism including paper controller DMP, can be buffered in an interposed memory P-SP. All the functional units of the printer controller PR-CTL and printer part PR are subject in this case to the common sequence control system CTL with the operator panel BF.

The design of the printer PRINTER represented is generally known and not the subject-matter of the invention. It is only co-used for direct filing by making available the printing data and pixel data required for filing. Consequently, there are two separate data and signal connections to the ancillary device PC, as well as a signal link for coordination between the sequence control system CTL of the printer PRINTER and the controller of the ancillary device.

The ancillary device PC can be designed in the same way as the part of FIG. 1 bordered by dots and dashes. In the present case, a design as a personal computer is chosen, the control being performed by the processor PROC in conjunction with the user interface of the personal computer.

The printing data for forming the stream IND-DAT of index data are tapped, in turn, at a separate connection interface of the computer D-SP and led to the control unit IND-CTL, while the pixel data PIX-DAT are tapped at the connection interface to the exposure unit BEL and fed to the control unit DCOMP. In addition, the sequence control system CTL of the printer PRINTER is connected via a control adapter CTL-AD to the controller of the ancillary device.

All the control units IND-CTL, DCOMP and CTL-AD are designed in this case as pluggable interface cards for connection to the system bus BUS of the computer PC. However, all three control units can also be combined on a single plug-in card. The connections to the printer PRINTER likewise expediently comprise lines with plug-in connectors at both ends.

Instead of the self-contained ancillary device PC shown in FIG. 2, said device can also be integrated as a separate subassembly in the printer PRINTER.

Differing from the apparatus in accordance with FIG. 1, in the present case the transmission of the pixel data to the ancillary device PC requires the provision of the same protocol as for transmission to the exposure unit BEL, and the control solely by the ancillary device PC is possible only when there is not a simultaneous printout by the printer PRINTER. If, by contrast, there is a printout, the control proceeds from the operator panel of the printer PRINTER, and the exposure unit BEL is decisive for controlling the transmission of the pixel data irrespective of whether filing is carried out simultaneously or not. This results in three different operating modes affecting the connection interface for relaying pixel data to the ancillary device PC, which connection interface can thus be controlled by the device BUM.

By contrast, as to the transmission of the printing data D-DAT to the ancillary device PC, the protocol can be freely selected, and the same is true for the exchange of signals between the sequence control system CTL of the printer PRINTER and of the control adapter CTL-AD at the ancillary device PC.

If the printer PRINTER is operated only as such, the device BUM simply switches off the connection to the ancillary device. If, by contrast, filing is to be carried out simultaneously, the retrieve clock pulses have to be switched to be inoperative by the device DCOMP. If, by contrast, only filing is carried out, the connection interface for the ancillary device PC becomes operative to the full extent, by way of contrast.

If filing is to be carried out, the controller of the ancillary device PC switches the devices IND-CTL and DCOMP to be inoperative, doing so either as an original controller or, in the case of simultaneously printing out, in a fashion initiated by the sequence control system CTL of the printer PRINTER via the signal link to the controller adapter CTL-AD, and as soon as the printer- 7a-controller PR-CTL signals the presence of pixel data the latter are retrieved, under the control of the device DCOMP or the exposure unit BEL, and processed, the unit DCOMP working as a compressor and supplying a compressed stream PIX-DAT' of pixel data. Parallel therewith, the associated printing data are retrieved in the memory D-SP by the device IND-CTL, and the stream IND-DAT of index data is generated. The two data streams are then stored in the main memory MM as buffer until being relayed via the transmitter control circuit LAN-CTL to the wiring system LAN leading to the filing system. The logic synchronization is performed in this case under software control by the controller of the personal computer PC.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for electronically filing documents prepared by a computer, the computer having a printer connection interface, and the computer connected to a printer having an exposure unit, comprising the steps of:

converting printing data, which is retrievable via the printer connection interface of the computer in the form of coded control statements, into a pixel data stream suitable for driving the exposure unit of the printer;

filtering out at least one of text information and bar codes as index data from the printing data to be converted into a pixel data stream, and neutralizing and converting the text information and bar codes into an index data stream; and feeding the pixel data stream and the index data stream, with identifiers indicating relatedness of parts of the pixel data stream and the index data stream, to a data carrier for filing.

2. The method as claimed in claim 1, wherein printing and pixel data required for filing a document are supplied by terminals of a printer controller of the printer connected to the computer supplying the printing data.

3. The method as claimed in claim 2, wherein different operating modes are selectable, and wherein, depending on a respectively selected operating mode, documents are fileable in parallel with, or without simultaneous printing out of the documents by a printer part of the printer, or else only printing out the documents without simultaneous filing thereof, control being performed from the ancillary device when only filing the documents, and from the printer when only printing out the documents.

4. The method as claimed in claim 1, wherein the pixel data stream is compressed before being relayed to the filing data carrier.

5. The method as claimed in claim 4, wherein the compressed pixel data stream and the index data stream are buffered before being relayed.

6. The method as claimed in claim 1, wherein in each case printing data of one document side of a document is converted and data streams resulting therefrom are fed in a pagewise fashion to the filing data carrier.

7. An apparatus for controlling the electronic filing of the documents prepared by a computer, comprising:

the apparatus connected on an input side of a printer to a printer connection interface of the computer supplying printing data for the documents, and on an output side to a filing data carrier;

devices for retrieving and for accepting the printing data from the computer;

devices for converting the printing data into a pixel data stream;

devices for filtering out and neutralizing at least one of text information and bar codes, contained in the printing data, as index data in the form of an index data stream; and devices for relaying the pixel data stream and the index data stream with identifiers indicating relatedness of parts of the pixel data stream and the index data stream to the data carrier.

8. An apparatus for controlling the electronic filing of the documents prepared by a computer, comprising:
- a printer connected to the computer, and an ancillary device, coupled to a printer controller of said printer as a link to a filing data carrier;
- the ancillary device having devices for exchanging control signals with the printer controller;
- the ancillary device having devices for controlling acceptance of a pixel data stream from the printer controller;
- the ancillary device having devices for controlling acceptance of printing data from the printer controller as well as for filtering out and neutralizing at least one of text information and bar codes, contained in the printing data, as index data, with formation of a corresponding index data stream; and
- the ancillary device having devices for relaying the pixel data stream and the index data stream with identifiers indicating relatedness of parts of the pixel data stream and the index data stream to the data carrier.

9. The apparatus as claimed in claim 8, wherein the ancillary device is an integral component of the printer.

10. The device as claimed in claim 8, wherein one interface which supplies the pixel data stream for an exposure unit of the printer serves as one of the connections for the ancillary device, and wherein the connection can be controlled in accordance with a respectively selected operating mode.

11. The apparatus as claimed in claim 8, wherein the apparatus has devices for buffering the pixel data stream and the index data stream formed before the relaying to the filing data carrier.

12. The apparatus as claimed in claim 11, wherein the apparatus has devices for compressing the pixel data stream before the buffering thereof.

13. The apparatus as claimed in claim 8, wherein the devices for forming the index data stream, for compressing the pixel data and for exchanging the control signals are pluggable interface cards for connection to a system bus of a personal computer which controls a filing operation, and wherein the personal computer has a main memory for buffering the pixel data stream and the index data stream.

14. The apparatus as claimed in claim 7, wherein the apparatus has devices for buffering the pixel data stream and the index data stream formed before the relaying to the filing data carrier.

15. The apparatus as claimed in claim 14, wherein the apparatus has devices for compressing the pixel data stream before the buffering thereof.

16. The apparatus as claimed in claim 7, wherein the devices for forming the index data stream, for compressing the pixel data and for exchanging the control signals are pluggable interface cards for connection to a system bus of a personal computer which controls a filing operation, and wherein the personal computer has a main memory for buffering the pixel data stream and the index data stream.

17. A method for electronically filing documents prepared by a computer, the computer having a printer connection interface, and the computer connected to a printer having an exposure unit, comprising the steps of:
- converting printing data, which is retrievable via the printer connection interface of the computer in the form of coded control statements, into a pixel data stream suitable for driving the exposure unit of the printer;
- filtering out at least one of text information and bar codes as index data from the printing data to be converted into a pixel data stream, and neutralizing and converting the text information and bar codes into an index data stream;
- feeding the pixel data stream and the index data stream, with identifiers indicating relatedness of parts of the pixel data stream and the index data stream, to a data carrier for filing;
- printing and pixel data required for filing a document being supplied by terminals of a printer controller of the printer connected to the computer supplying the printing data; and
- selecting an operating mode from a plurality of different operating modes and, depending on a respectively selected operating mode, documents are fileable in parallel with, or without simultaneous printing out of the documents by a printer part of the printer, or else only printing out the documents without simultaneous filing thereof, control being performed from the ancillary device when only filing the documents, and from the printer when only printing out the documents.

18. A method for electronically filing documents prepared by a computer, the computer having a printer connection interface, and the computer connected to a printer having an exposure unit, comprising the steps of:
- converting printing data, which is retrievable via the printer connection interface of the computer in the form of coded control statements, into a pixel data stream suitable for driving the exposure unit of the printer;
- filtering out at least one of text information and bar codes as index data from the printing data to be converted into a pixel data stream, and neutralizing and converting the text information and bar codes into an index data stream; and
- feeding the pixel data stream and the index data stream, with identifiers indicating relatedness of parts of the pixel data stream and the index data stream, to a data carrier for filing; and
- converting printing data of one document side of a document, and feeding data streams resulting therefrom in a pagewise fashion to the filing data carrier.

19. An apparatus for controlling the electronic filing of the documents prepared by a computer, comprising:
- a printer connected to the computer, and an ancillary device, coupled to a printer controller of said printer as a link to a filing data carrier;
- the ancillary device having devices for exchanging control signals with the printer controller;
- the ancillary device having devices for controlling acceptance of a pixel data stream from the printer controller;
- the ancillary device having devices for controlling acceptance of printing data from the printer controller as well as for filtering out and neutralizing at least one of text information and bar codes, contained in the printing data, as index data, with formation of a corresponding index data stream;
- the ancillary device having devices for relaying the pixel data stream and the index data stream with identifiers indicating relatedness of parts of the pixel data stream and the index data stream to the data carrier; and
- interface which supplies the pixel data stream for an exposure unit of the printer serving as one of the connections for the ancillary device, and the connection being controlled in accordance with a respectively selected operating mode.

20. An apparatus for controlling the electronic filing of the documents prepared by a computer, comprising:
- a printer connected to the computer, and an ancillary device, coupled to a printer controller of said printer as a link to a filing data carrier;

the ancillary device having devices for exchanging control signals with the printer controller;

the ancillary device having devices for controlling acceptance of a pixel data stream from the printer controller;

the ancillary device having devices for controlling acceptance of printing data from the printer controller as well as for filtering out and neutralizing at least one of text information and bar codes, contained in the printing data, as index data, with formation of a corresponding index data stream;

the ancillary device having devices for relaying the pixel data stream and the index data stream with identifiers indicating relatedness of parts of the pixel data stream and the index data stream to the data carrier; and the devices for forming the index data stream, for compressing the pixel data and for exchanging the control signals being pluggable interface cards for connection to a system bus of a personal computer which controls a filing operation, and wherein the personal computer has a main memory for buffering the pixel data stream and the index data stream.

21. An apparatus for controlling the electronic filing of the documents prepared by a computer, comprising:

the apparatus connected on an input side of a printer to a printer connection interface of the computer supplying printing data for the documents, and on an output side to a filing data carrier;

devices for retrieving and for accepting the printing data from the computer;

devices for converting the printing data into a pixel data stream;

devices for filtering out and neutralizing at least one of text information and bar codes, contained in the printing data, as index data in the form of an index data stream;

devices for relaying the pixel data stream and the index data stream with identifiers indicating relatedness of parts of the pixel data stream and the index data stream to the data carrier; and the devices for forming the index data stream, for compressing the pixel data and for exchanging the control signals being pluggable interface cards for connection to a system bus of a personal computer which controls a filing operation, and the personal computer having a main memory for buffering the pixel data stream and the index data stream.

22. A method for electronically filing documents prepared by a computer, the computer having a printer connection interface, and the computer connected to a printer having an exposure unit, comprising the steps of:

converting printing data, which is retrievable via the printer connection interface of the computer in the form of coded control statements, into a pixel data stream suitable for driving the exposure unit of the printer;

filtering out at least one of text information and bar codes as index data from the printing data to be converted into a pixel data stream, and neutralizing and converting the text information and bar codes into an index data stream;

feeding the pixel data stream and the index data stream, with identifiers indicating relatedness of parts of the pixel data stream and the index data stream, to a data carrier for filing; and different operating modes being selectable, and, depending on a respectively selected operating mode, documents being fileable in parallel with, or without simultaneous printing out of the documents by a printer part of the printer, or else only printing out the documents without simultaneous filing thereof.

* * * * *